M. R. HUTCHISON.
SPEED INDICATING SYSTEM.
APPLICATION FILED SEPT. 17, 1909.

982,499.

Patented Jan. 24, 1911.
4 SHEETS—SHEET 1.

WITNESSES:

INVENTOR
BY
ATTORNEY

M. R. HUTCHISON.
SPEED INDICATING SYSTEM.
APPLICATION FILED SEPT. 17, 1909.

982,499.

Patented Jan. 24, 1911.
4 SHEETS—SHEET 4.

WITNESSES:
Chas. F. Clagett

INVENTOR
Miller Reese Hutchison
BY
George C. Dean
ATTORNEY

UNITED STATES PATENT OFFICE.

MILLER REESE HUTCHISON, OF SUMMIT, NEW JERSEY.

SPEED-INDICATING SYSTEM.

982,499.  Specification of Letters Patent.  Patented Jan. 24, 1911.

Application filed September 17, 1909. Serial No. 518,198.

*To all whom it may concern:*

Be it known that I, MILLER REESE HUTCHISON, a citizen of the United States, and a resident of Summit, in the county of Union and State of New Jersey, have invented certain new and useful Improvements in Speed-Indicating Systems, of which the following is a specification.

My present invention includes certain forms of speed indicating units, selected from the many forms described in my prior application Serial No. 450,059, filed August 24th, 1908, as to which this application may be considered as in part a continuation.

The present invention also contemplates employment of a multiple station system wherein independent units each comprising separate wiring for separate generators and indicators, are used for each indicating station, as described in said prior application.

It also includes a system of primary and secondary units whereby the generators may be multiplied conveniently by mere addition of such secondary units without unnecessary duplication of the auxiliary parts which, when once supplied with the primary generator units, may be utilized for all secondary generator units.

This invention also includes various improvements which I have found to be extremely important in the actual practice of the invention under working conditions.

My present system is particularly adapted for use on shipboard, and contemplates the employment of a complete indicating system for each propeller shaft of the ship, as well as a separate indicator for each station and preferably two energizing generators for each indicator, together with independent circuit connections from each pair of generators to the indicator controlled thereby. Thus, if the ship has four propellers, and it is desired to indicate at three stations revolutions of each shaft ahead and astern, as, for instance, in the engine room, on the bridge, and at the wheel, there are four indicators, one for each shaft, at each station, and there are preferably two generators for each such indicator, thus making three pairs of generators on each shaft.

The particular form of generator selected for illustration herein is substantially that indicated in Figures 3, 4, and 5 of the above application, insomuch as the generators are induction generators adapted to give voltage variations varying in approximate proportion to variation of speed of the inductor shaft throughout the range of speeds to be indicated.

The indicators are preferably provided with central zero scales and with separate coils adapted to be separately energized by conjoint action of the separate voltages from a pair of generators, in such manner that the pointer will be deflected on one side of zero for speeds in one direction and on the other side of zero for speeds in the reverse. The indicators are separately calibrated to give the true revolutions per minute value of propeller shaft rotation.

As is fully explained in my prior application, the actuation of the measuring instrument depends upon the phase relations of two generators constituting a pair, one of said generators being arranged for slip of 90 degrees when the direction of rotation is reversed, thereby changing the phase of the voltage generated therein 180 degrees, this reversal of phase relations causing the deflection of the indicator to reverse its direction, as, for instance, from deflections to the right for revolutions ahead to deflections to the left for revolutions astern.

Where direct current tachometers have failed has been in the variable contact of commutator and brushes, especially obtaining aboard ship. The indications of centrifugal tachometers become unreliable owing to fatigue of the compressed spring. These defects are avoided in my system, because there are no sliding or abutting contacts, all connections are soldered, and the design of the magneto is such that the permanent magnets, properly made and aged, have a practically closed magnetic circuit at all times. In the measuring instrument the armature springs bringing the indicator back to zero have but slight strains imposed and are very long.

In my system, momentary variations of shaft speed, such as would result in uncertain vibration of the pointer, may be averaged and smoothed out to any extent desired. My apparatus for averaging such variations of speed so as to produce an accurate steady rate indication, is preferably mechanical and consists of a spring drive or coupling introduced somewhere between the propeller shaft and the generator shaft, whereby, in a given length of time, the driven member is forced to maintain its ratio of total revolutions with respect to the drive, but, by reason of its inertia, it may lag behind the driver, compressing the spring and storing up power on rise of speed of the propeller shaft and leading or overrunning the driver when speed of the latter falls off. The action is preferably supplemented and controlled by means of a fly wheel between the spring and the generator, which serves to maintain the speed of the generator shaft when the propeller shaft momentarily slows down, and to hold down the speed of the generator when the driver momentarily speeds up. By varying the spring and fly wheel the indications may be made either to follow the speed variations quite closely, or to average them for a number of revolutions.

My invention also includes an improvement in connection with the phase shifting generator, which obviates a possible source of error or uncertainty in the indications. This difficulty arises from the fact that the rotor is a relatively light inductor or magnetic shield, rotating in the space between the poles of the permanent field and a central stationary armature, which is energized by cyclic distortion and shortcircuiting of the magnetic field by the inductor. In this type of machine, the work done by the drive shaft is very irregularly distributed, insomuch as the portion of rotation where the inductor is approaching the pole is assisted by magnetic attraction of that pole, whereas the movement of the inductor away from the pole is resisted. Hence, with a light inductor having a slip connection to the drive shaft, the inductor tends to jump forward through a small arc at a speed greater than the speed of the drive shaft, whenever said inductor is approaching a pole. The physical evidence of this is a chattering of the slip connection of the rotor to the drive shaft and the electrical result is a disturbance in the uniformity of the voltage generation and also a slight instantaneous shifting of the phase relations, both of which tend to impair the steadiness and the reliability of the indications. The above described difficulty may be overcome by addition of any expedient for opposing this polar acceleration movement of the inductor, a convenient embodiment of which expedient consists in a relatively small balance wheel rigidly secured to the inductor shaft. The energy storing capacity of this balance wheel should be such that the acceleration effort upon the inductor when approaching a pole will be absorbed and resisted. At the same time, the energy storing capacity of the balance wheel should not be great as compared with the total work done in the generator, for otherwise the speed of the inductor will not fall off fast enough in case of rapid decrease in velocity of the drive shaft, as when the propeller is stopped or reversed.

In the practical installation of a system, such as above described, the convenient grouping of the pairs of generators with respect to a single drive shaft controlled by an equalizer coupling between it and the propeller shaft and also the grouping of the pairs with respect to each other are of considerable practical importance. According to my invention, I provide a single equalizer and propeller shaft connection with the primary set which also comprises at least one generator, controlling one indicator for one station, and then if indicators are required for other stations, I arrange additional generators or pairs of generators symmetrically disposed about the same shaft and gear, or on a shaft adapted to be alined and coupled to said shaft; or I may utilize both these expedients, as in the preferred form selected for illustration herein.

Each indicator has its own pair of magnetos. These pairs are grouped in generating sets, four magnetos to each primary unit, and four or two to each extension unit, depending on the number of indicators desired. It is, therefore, evident that the shooting away or otherwise damaging any one indicator does not affect any of the others. This is important on warship systems.

An important feature of this system is the employment of magnetos capable of generating only very minute current and low voltage, just sufficient to operate the high resistance indicators. Therefore, opening the circuit produces only a very faint, cool spark, and short circuiting causes substantially no heating of conductors. The advantage is obvious. The magnetos are so designed and wound that continued short circuiting causes no injury whatever to them.

The indicators are properly waterproofed according to naval requirements.

The periodicity of the indicator pointer is so much less than that of the ship that pitching does not affect it. If the indicator is placed with its scale in a plane extending fore and aft, the pointer will be substantially unaffected by rolling of the ship. The movable coil and pointer being mounted on round jeweled pivots in the usual manner successfully resist mechanical jar, and are properly damped to make the instrument practically dead-beat.

As stated, each indicator has its generating pair. The fixed indicators are permanently connected thereto, but any number of outlets can be provided for a portable indicator. If two portable indicators are necessary, two generating pairs must be provided, and due attention paid to the fact that each indicator is calibrated on its own generating set. Owing to the absence of rotating parts other than easily oiled parts, with no contacts to clean and all designed to give continued service over long intervals, no attention is necessary.

In the accompanying drawings.

Figure 1:
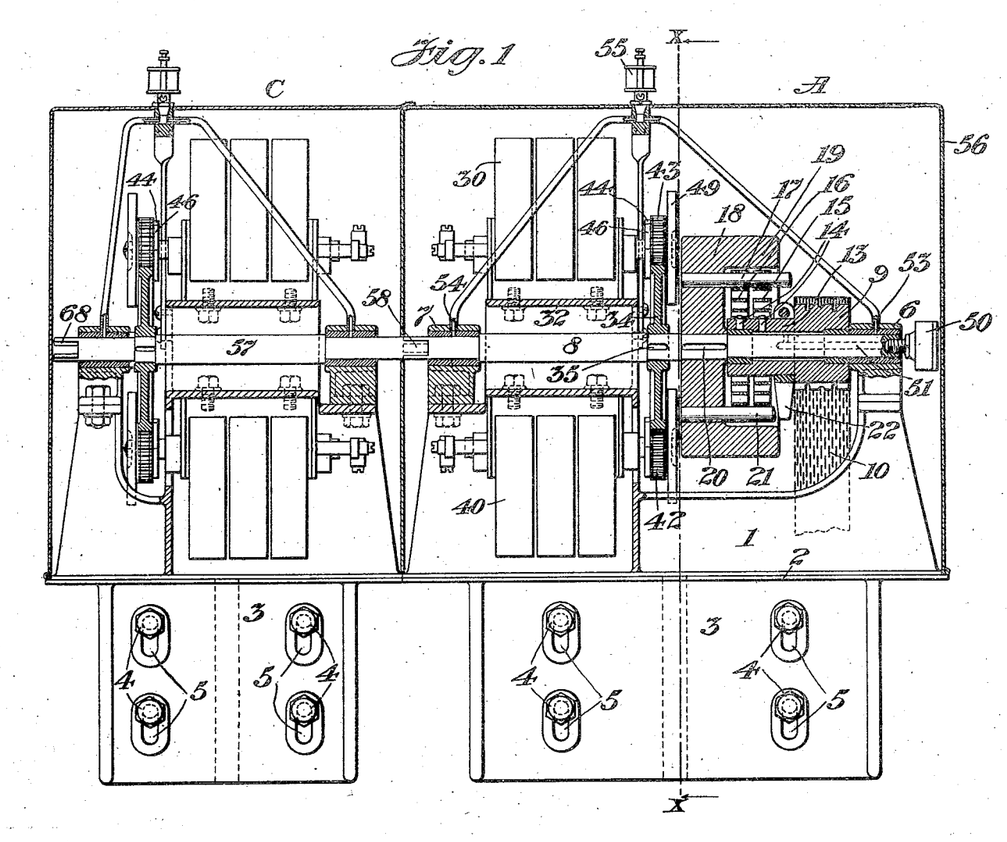
Fig. 1 is a vertical section longitudinally of the drive shaft of a practical form of generator outfit suitable for commercial installations.
Figure 2:
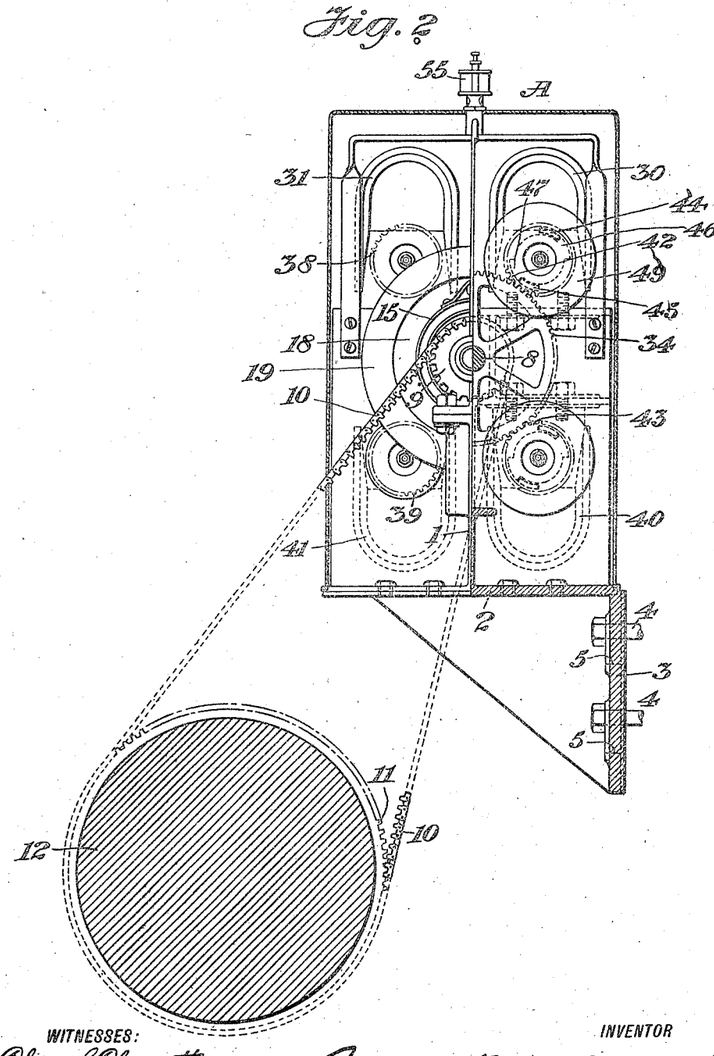
Fig. 2 is an end elevation with one-half of the apparatus broken away in vertical transverse section on the line X—X, Fig. 1.
Figure 3:
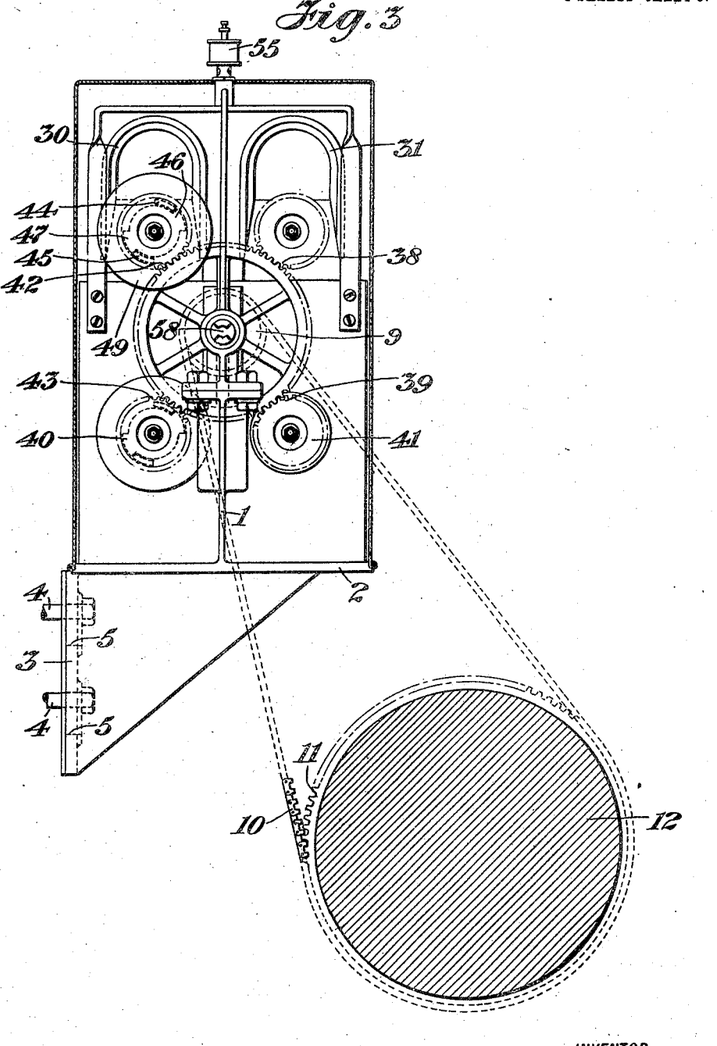
Fig. 3 is an end elevation from the left of Fig. 1, the protecting case being shown in section.

By reference to Figs. 1, 2, and 3, it will be seen that the generator outfit is specifically adapted for a multiple station system wherein disturbance or accident, such as short-circuiting or open circuiting, in the circuit of any one station cannot interfere with or vary the indication of any other station, insomuch as all of the electrical part of each generating, transmitting, and indicating outfit for each station is complete and independent of that of similar parts for every other indicating station, but such independent electrical parts of the outfit are associated with a single mechanical outfit, which serves for all. This mechanical portion of the outfit includes a drive shaft, a positive transmission mechanism between it and the propeller shaft whereby the total number of revolutions of the common shaft must bear a fixed ratio to the total number of revolutions of the propeller shaft and yet the ratio at any one instant may be greater or less so as to permit fluctuation of speed of the propeller shaft to be averaged to a desired extent on the drive shaft. In the specific outfit selected for illustration, the system is one in which a pair of generators is required for each indicator; but it will be obvious that the same physical disposition and mechanical arrangement of parts may be usefully employed for any outfit where a number of generators are to be used, irrespective of whether a single generator, or a plurality of generators, are used in connection with the several indicators, or whether used for the production of the indications at a single station or at several stations.

Functionally considered, the primary unit consists of the mechanical means for deriving suitably proportioned and averaged rotation from the propeller shaft and includes parts to the right of the line X—X, Fig. 1, this portion of the outfit being marked A. This part of the outfit includes a base comprising a standard 1, secured to a base plate 2, adapted to be secured by a bracket 3 and bolts 4 to any suitable vertical support. The bolts extend through slots 5 to permit of final leveling and vertical adjustment. For marine purposes, the bracket is preferably secured to a fore and aft bulkhead between propeller shafts. The standard 1 has bolted thereto bearings 6, 7, for the shaft 8. This shaft is driven by the propeller shaft through a positive drive transmission, and a speed averaging coupling. This drive mechanism comprises a loose sprocket gear 9 engaging an antifriction noiseless Morse sprocket chain 10, driven by a suitable collar gear 11 on propeller shaft 12. The sprocket gear 9 has an integral hub or sleeve 13, to which are secured by pins 14, 14 oppositely coiled spiral springs 15, 16, secured at their outer ends to pin 17 on fly wheel 18, which is formed with an overhanging rim 19, which serves as a housing to protect such springs. The fly wheel 18 is fixed to the shaft 8 by a key 20. Other pins, one of which is shown at 21 in Fig. 1 of the drawings, may be provided for securing the coil springs under different degrees of tension. In order to limit the extent to which the shaft 8 and fly wheel 18 may lag behind or lead the pulley 9, the sleeve 13 of the latter has secured thereto a radially projecting lug 22, extended into the circular path of travel of the pin 17 and substantially diametrically opposite thereto. This limits both the lead and lag of fly wheel 18 to a half revolution.

The generators could be added by separate extension units to the above described parts, such as shown at C, but insomuch as at least one generator is always used, I prefer to combine with the primary unit, one or more generators. In the outfit shown, generators 30 and 31 are arranged as a pair bolted to the bed 32, formed on standard 1. A similar pair 40, 41, may be arranged symmetrically with respect to said pair 30, 31, and with respect to the shaft 8. In this way provision is made for driving four generators from a single gear 34, secured to shaft 8 by key 35. The gear connections of the generator 40 are the same as those of generator 30, and those of generator 41 are the same as those of generator 31, except that 40 and 41 are inverted. Generators 31 and 41 are driven through gears 38, 39, rigidly secured to the inductor shafts thereof, and generators 30, 40 are driven through similar gears 42, 43, respectively, which are mounted loosely on the inductor shafts, and drive the latter through the medium of laterally projecting concentric lugs 44, 45, engaging lugs 46, 47, which are rigidly secured to the inductor shaft. The peripheral spacing of the projections 44, 45, and lugs 46, 47, is so proportioned as to permit slip through 90 degrees when the shaft is reversed. The small balance wheel 49, proportioned as hereinbefore described, and rigidly secured to the inductor shaft prevents chattering of the slip coupling.

Lubrication is provided for by means of grease cup 50, discharging through a suitable channel 51, within sprocket gear 9. The movement of this gear on its bearings is limited to the half revolution permitted by lug 22 and pin 17. Hence, it need be lubricated only at very long intervals. The bearings 6, 7, in which the shaft 8 may rotate at considerable speeds, are preferably lubricated through ducts 53, 54 supplied from reservoir 55.

The above described mechanism is preferably inclosed by a protecting case 56.

The end of the shaft 8 is extended beyond the bearing 7 to afford means for coupling on any desired number of extension generator units. Such a unit C is practically a duplicate of the mechanism above described, with the positive drive and spring coupling omitted, because the extension unit is driven from the shaft 8, which already has the required proportioned and averaged rate of rotation with respect to the propeller. The extension unit is arranged with its drive shaft in line with the shaft 8 and longitudinally interlocked therewith, as at 58. The outer end 68 of the shaft 57, projects beyond its bearing so as to afford means for coupling on an additional extension unit, which may be similar to itself in all respects.

It will be obvious from the above that all the magnetos are driven at the same speed, which is a speed directly proportional to the speed of the shaft 8, and that the speed of the shaft 8 is properly averaged for variations of the propeller shaft by the spring coupling, while its total number of revolutions per unit time always bears a fixed ratio to the total number of revolutions of the propeller shaft, and also that the ratio of the gearing is such that the slowest contemplated rotation of the propeller shaft 12 will drive the generator shafts at a speed sufficient to generate an appreciable voltage sufficient to give definite variations on the indicator.

Figure 4:
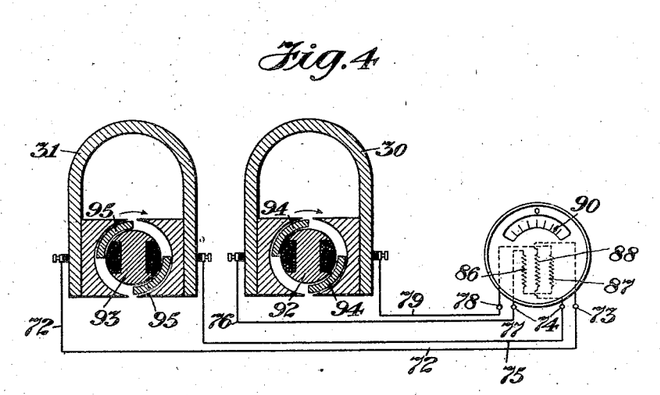
Fig. 4 is a detail diagram of a pair of generators and their circuit connections to an indicator controlled thereby.
Figure 5:
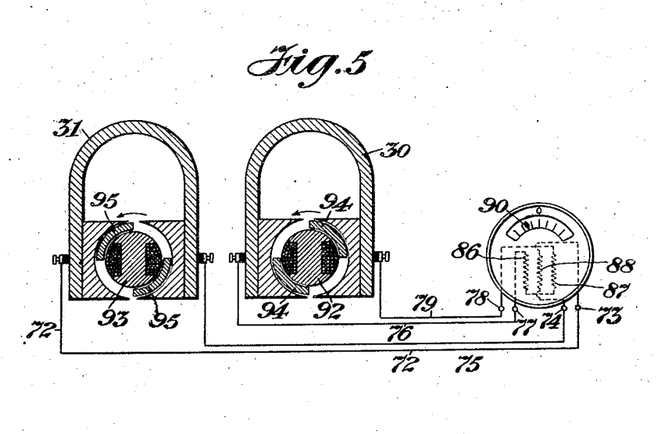
Fig. 5 is a similar view showing the shifting of relations of parts when the direction of rotation is reversed.
Figure 6:
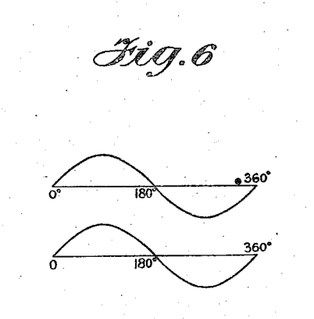
Figs. 6 and 7 are diagrams of the phase relations under the conditions illustrated in Figs. 4 and 5 respectively.
Figure 7:
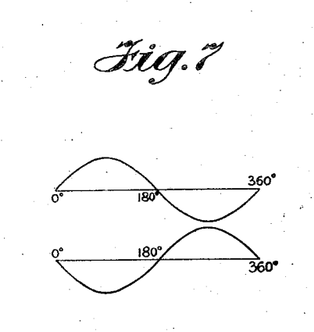

In Figs. 4, 5, 6, and 7, I have shown the physical and electrical relations of the two generators constituting a pair, both with respect to each other and with respect to the reactive parts of the indicator. Figs. 4 and 6 illustrate these conditions when the propeller shaft is driven in one direction, while Figs. 5 and 7 illustrate the conditions when the propeller shaft is reversed.

The two magnetos 30, 31, have stationary armatures 92, 93, respectively, and their rotary inductors 94, 95 are both driven from the same shaft 8. One of them, as at 31, has its inductor 95 rigidly keyed to its shaft, while the other, as 30, is secured so as to slip circumferentially through an angle of 90 degrees. In one direction of rotation the slip of 94 brings it in exact phase with 95, as shown in Figs. 4 and 6, whereas rotation in the other direction, accompanied by circumferential slip through an angle of 90 degrees, changes the phase of the alternating current produced thereby 180 degrees with respect to the currents generated in 92, as shown in Figs. 5 and 7. The voltages of the two generators are applied through independent circuits to the stationary field coils and movable indicator coil respectively.

The operation is as follows: When the generator shaft is rotated in a direction to bring the generators in the same phase, as shown in Fig. 4, the voltage is applied through lead 72 and terminal 73, to coil 88, thence back through terminal 74 and return 75, to the other terminal of the generator 31. Currents in the same phase from generator 30 traverse lead 76 to terminal 77, thence through field coils 86, 87, to terminal 78, thence through return 79, back to generator 30. The independent currents in the same direction and phase thus caused to traverse the field and indicator coils cause deflection of the index 90 in a direction indicated in Fig. 4, as toward the right. When the generator shaft reverses and the independent currents become of opposite phase by slip of inductor 94, as shown in Fig. 5, the current from 31 through the indicator coil, is the same as before, but the current from 30 is reversed with respect thereto, so that when the alternation causes flow of current from 31 out through 72, an equal current from 30, instead of flowing out through 76 and back through 79, flows out through 79 and back through 76, thus causing the index 90 to move to the left, as indicated in Fig. 5.

Installing the generating units in the shaft alley is a very simple matter, the support being provided by the fore-and-aft bulkhead. The large sprocket is previously made to conform to the shaft diameter, and the smaller sprocket proportioned to shaft diameter and maximum speed of rotation.

Calibration is done aboard ship, after the indicators are installed and connected to their generators by separate circuits run through separate conduits. The large sprocket which is to be attached to the propeller shaft is attached to a motor driven dummy shaft, and the generator sets, mounted permanently in position, are chain driven therefrom. To the dummy shaft is geared a standardized tachometer. Temporary telephonic connection is made between the calibrator and each of the men stationed at the indicators. The speed of the dummy shaft is gradually accelerated and as the standardized tachometer readings are phoned to the indicator men, the scale subdivisions are made by a special marking tool mounted on a bridge over dist. These are then filled in properly and the calibration is done. As each instrument is calibrated in its position as well as on its own generators, all factors which might interfere with perfect accuracy of the indications are compensated for by the calibration. The large sprocket is then transferred from the dummy shaft to the propeller shaft at a point opposite the sprocket 9 and the chain 10 is applied. The revolution indication having been correctly indicated for the large sprocket, the indications will be correct when that sprocket is transferred to the propeller shaft.

While I have herein fully shown and described, and have pointed out in the appended claims certain novel features of construction, arrangement, and operation which characterize my invention, it will be understood by those skilled in the art that various omissions, substitutions, and changes in the forms, proportions, sizes, and details of the device and of its operation, may be made without departing from my invention.

I claim:

1. The method of determining or indicating speed or rates of work of an apparatus both when driven forwardly and when reversed, which comprises generating a plurality of sets of alternating voltages or currents proportional to the speed or rate of work of such apparatus and in one phase relation when the apparatus is driven in one direction, and in another phase relation when the apparatus is driven in the other direction, and compounding and measuring the voltages or currents of each set.

2. The method of determining or indicating speed or rates of work of an apparatus both when driven forwardly and when reversed, which comprises controlling the generation of a plurality of sets of alternating voltages or currents in such manner as to cause the same to vary proportionately to the speed or rate of work of the apparatus, compounding each set of voltages or currents in such a manner that the said voltages or currents react in phase when the apparatus is driven in one direction, and out of phase when the apparatus is driven in the other direction, and measuring the compounded voltages or currents.

3. The method of determining or indicating speed or rates of work of an apparatus both when driven forward and when reversed, which comprises generating by induction a plurality of sets of alternating voltages or currents proportional to the speed or rate of work of such apparatus and in phase when the apparatus is driven in one direction, and out of phase when the apparatus is driven in the other direction, and compounding and measuring the voltages or currents of each set.

4. In a speed indicator, two induction generators, connections from one generator to the other whereby the two generators are caused to be driven together in both directions, the setting of said connections with respect to the generators being changeable upon the reversal of the drive to cause the generators to act in one phase relation or in another phase relation, according to the direction of the drive, and means connected to the generators for indicating speed in one direction when the generators are in one of said phase relations and in the other direction when the generators are in the other of said phase relations.

5. In a speed indicator, two induction generators, connections from one generator to the other whereby the two generators are caused to be driven together in both directions, the setting of said connections with respect to the generators being automatically changeable upon the reversal of the drive to cause the generators to act in phase, or out of phase, according to the direction of the drive, and means connected to the generators for indicating speed in one direction when the generators are in phase and in the other direction when the generators are out of phase.

6. In a speed indicator, two electrical generators, connections from one generator to the other whereby the two generators are caused to be driven together in both directions, the setting of said connections with respect to the generators being changeable upon the reversal of the drive to cause the generators to act in one phase relation, or in another phase relation, according to the direction of the drive, and means connected to the generators for indicating speed in one direction when the generators are in one of said phase relations and in the other direction when the generators are in another of said phase relations.

7. In a speed indicator, two induction generators, connections from one generator to the other whereby the two generators are caused to be driven together in both directions, the setting of said connections with respect to the generators being changeable upon reversal of the drive to cause the generators to act in phase, or out of phase, according to the direction of the drive, and a meter having windings one of which is connected to one generator and another of which is connected to the other generator, said windings having relative movement in one direction when the generators are in phase, and in another direction when the generators are out of phase.

8. In a speed indicator, two induction generators, connections from one generator to the other whereby the two generators are caused to be driven together in both directions, the setting of said connections with respect to the generators being changeable upon reversal of the drive to cause the generators to act in phase, or out of phase, according to the direction of the drive, and a volt meter having a field winding connected to one of said generators, and an indicator winding connected to the other of said generators.

9. In a speed indicator, two induction generators, connections from one generator to the other whereby the two generators are caused to be driven together in both directions, the setting of said connections with respect to the generators being changeable upon the reversal of the drive to cause the generators to act in phase, or out of phase, according to the direction of the drive, and a volt meter connected to the generators for indicating speed in one direction when the generators are in phase and in the other direction when the generators are out of phase.

10. In a speed indicator, two induction generators, connections from one generator to the other whereby the two generators are caused to be driven together in both directions, said connections permitting of a limited angular shift or slip of one generator with respect to the other upon reversal of the drive to cause the generators to act in phase, or out of phase, according to the direction of the drive, and means connected to the generators for indicating speed in one direction when the generators are in phase and in the other direction when the generators are out of phase.

11. In a speed indicator, two electrical generators, means for causing said generators to act in phase when driven in one direction and out of phase when driven in the other direction and to shift from one phase setting to the other phase setting when the direction of the drive is changed, and means connected to the generators for indicating speed of drive in one direction when the generators are in phase, and for indicating speed of drive in the other direction when the generators are out of phase.

12. In a speed indicator, two electrical generators, means for causing said generators to act in phase when driven in one direction and out of phase when driven in the other direction and automatically to shift from one phase setting to the other phase setting when the direction of the drive is changed, and means connected to the generators for indicating speed of drive in one direction when the generators are in phase, and for indicating speed of drive in the other direction when the generators are out of phase.

13. In a speed indicator, two electrical generators, means for causing said generators to act in phase when driven in one direction and out of phase when driven in the other direction, and to shift from one phase setting to the other phase setting when the direction of the drive is changed, and indicating means controlled by connections from said generators, and having two scales and a device movable relatively thereto to indicate on one scale the rates of drive in one direction and on the other scale the rates of drive in the other direction, according to the phase relation of the generators.

14. In an apparatus of the class described, a movable device the speed and direction of movement of which is to be determined, a pair of alternating current generators having permanent magnetic fields and stationary armature windings, in combination with means connecting the generators with said movable device for driving the generators at speeds corresponding to the speeds of said movable device, and means comprising separate circuits from said generators compounded in a single indicating device for utilizing the voltages of said generators to produce proportional indications of the speeds of the movable device, and to indicate the direction of motion of the movable device.

15. In an apparatus of the class described, a movable device the speed and direction of movement of which is to be determined, a pair of alternating current generators having stationary permanent magnetic fields, stationary armature windings, and rotating inductors, in combination with means connecting the generators with said movable device for driving the generators at speeds corresponding to the speeds of said movable device, and means comprising separate circuits from said generators compounded in a single indicating device for utilizing the voltages of said generators to produce proportional indications of the speeds of the movable device, and to indicate the direction of motion of the movable device.

16. In an apparatus of the class described, a movable device the speed and direction of movement of which is to be determined, a pair of alternating current generators, each generator being proportioned and arranged to generate voltages approximately proportional to speeds of its shaft throughout a considerable range of speeds of said shaft, multiplying driving connections between said movable device and said generators, the ratio of multiplication being predetermined with respect to the speeds of the driving member and to the speeds of proportional variations of voltages of the generators, so that the normal range of speeds of said driving member will drive the generators at speeds lying within the limits of said proportional variation of voltage, together with means comprising separate circuits from said generators compounded in a single indicating device for utilizing the voltages of said generators to produce proportional indications of the speeds of said movable device and to indicate the direction of its motion.

17. A multiple station speed indicator, comprising a central generating station consisting of a plurality of generators, a proportional speed shaft, and multiple gearing connecting said generators with said proportional speed shaft to drive all the generators at the same speed, in combination with a shaft whose speed is to be measured and to which said central generating station is adjacent, positive multiplying driving and speed-averaging connections between said last named shaft and said proportional speed shaft, and a plurality of speed indicating instruments in circuit with the central station.

18. A multiple station speed indicating system comprising an indicator, circuit connections, and a generator for each station, all said generators being located at a central station, and means for positively driving said generators at the same speed, said driving means comprising a common multiplying and variation-averaging power connection to the shaft whose speed is to be measured.

19. In a multiple generator speed indicating system, a proportional speed shaft adjacent the shaft whose speed is to be measured, intermediate power connections for driving said proportional speed shaft and for averaging thereon the momentary variations of the drive shaft, in combination with a plurality of alternating current generators, driving means between said proportional speed shaft and said generators whereby said generators are driven at the same speed in a predetermined phase relation by said proportional speed shaft, and speed indicating means connected to said generators and actuated therefrom.

20. In a multiple generator speed indicating system, an indicating device, a proportional speed shaft adjacent the shaft whose speed is to be measured, intermediate power connections for driving said proportional speed shaft and for averaging thereon the momentary variations of the drive shaft, in combination with a plurality of alternating current generators connected to said indicating means to actuate the latter, said generators being positioned on opposite sides of said shaft, and means for driving said generators at the same speed from said shaft.

21. In a multiple generator speed indicating system, a proportional speed shaft adjacent the shaft whose speed is to be measured, intermediate power connections for driving said proportional speed shaft and for averaging thereon the momentary variations of the drive shaft, in combination with a plurality of alternating current generators arranged above and below said shaft, means for driving said generators at the same speed from said shaft, and speed indicating means connected to said generator and actuated therefrom.

22. In a multiple generator speed indicating system, a proportional speed shaft adjacent the shaft whose speed is to be measured, intermediate power connections for driving said proportional speed shaft and for averaging thereon the momentary variations of the drive shaft, in combination with a plurality of alternating current generators arranged in pairs, means for driving said generators at the same speed from said proportional speed shaft, and speed indicating means connected to said generators and actuated therefrom.

23. A multiple generator speed indicating system, comprising a proportional speed shaft adjacent the shaft whose speed is to be measured, intermediate power connections for driving said proportional speed shaft and for averaging thereon the momentary variations of the drive shaft, a plurality of alternating current generators arranged in pairs, a single gear wheel mounted on said proportional speed shaft, driving connections from said gear to each of said pairs of generators, and speed indicating means connected to said generators and actuated therefrom.

24. A speed indicating system comprising a pair of alternating current generators, means for driving them at the same angular speed in either direction of rotation so as to generate voltages in phase when the generators are rotated in one direction, said driving means having a slip member to permit of angular slip of one generator with respect to the other upon reversal of the drive and having means for limiting such slip, whereby the phase relation of said generators is changed one hundred and eighty degrees when the drive is reversed, an energy absorbing means for controlling the action of said slip member, and speed indicating means connected to said generators and actuated therefrom.

25. In a speed indicating system depending for its operation on the shift of phase relations of alternating currents, two alternating current generators, one of said generators comprising a stationary permanent magnetic field, a stationary armature, and a rotary inductor having a slip connection with its drive shaft, whereby reversal of the shaft causes slip of one generator with respect to the other through an angular distance corresponding to a half cycle of the alternating current, in combination with energy absorbing means adapted to absorb an amount of energy large as compared with the momentary acceleration efforts on the inductor and small as compared with the total work done by the inductor, and speed indicating means connected to said generators and actuated therefrom.

26. In a speed indicating system depending for its operation on the shift of phase relation of alternating currents, two alternating current generators, one of said generators comprising a stationary permanent magnetic field, a stationary armature, and a rotary inductor having a slip connection with its drive shaft, whereby reversal of the shaft causes limited slip of one generator with respect to the other through an angular distance corresponding to a half cycle of the alternating current, in combination with a fly wheel proportioned to have an energy storing capacity large as compared with the momentary acceleration efforts on the inductor and small as compared with the total work done by the inductor, and speed indicating means connected to said generators and actuated therefrom.

27. In a multiple generator speed indicating system, a primary unit comprising a proportional speed shaft adjacent the shaft whose speed is to be measured, an intermediate power connection for driving said proportional speed shaft from said second named shaft and for averaging thereon the momentary variations of the drive shaft, in combination with an extension unit comprising a second shaft adapted to be alined with and coupled to said proportional speed shaft, alternating current generators arranged about said second shaft, and gearing means connecting said generators and said second shaft, and speed indicating means connected to said generators and actuated therefrom.

Signed at New York city, in the county and State of New York, this 15th day of September, A. D. 1909.

MILLER REESE HUTCHISON.

Witnesses:
GEORGE C. DEAN,
IRVING M. OBRIEGHT.